May 23, 1950        W. E. SCOTT        2,508,805
FRUIT PICKING DEVICE

Filed Oct. 31, 1947        2 Sheets-Sheet 1

INVENTOR
WILLIAM E. SCOTT
BY
Mason & Graham
ATTORNEYS

May 23, 1950 W. E. SCOTT 2,508,805
FRUIT PICKING DEVICE
Filed Oct. 31, 1947 2 Sheets-Sheet 2
FIG. 6.
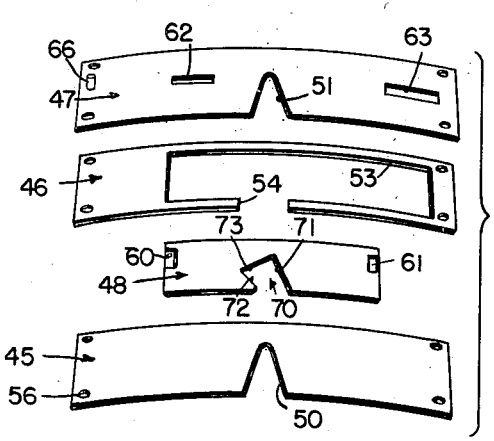
FIG. 12.
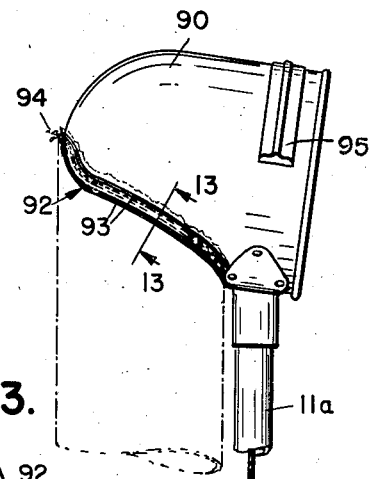
FIG. 7.
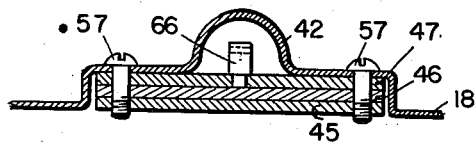
FIG. 13.
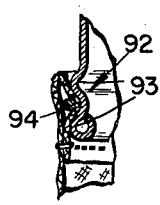
FIG. 8.
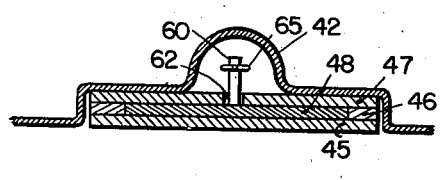
FIG. 14.
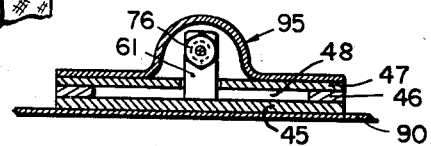
FIG. 9.
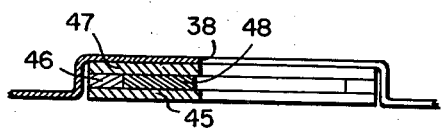
FIG. 15.
FIG. 10.
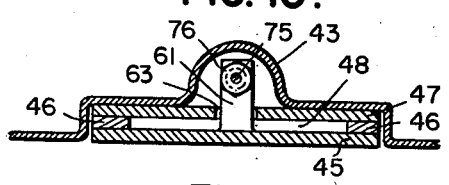
FIG. 11.
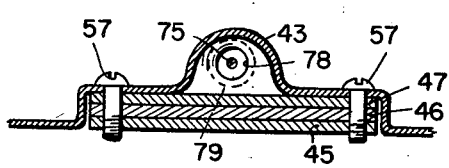
INVENTOR
WILLIAM E. SCOTT
BY
*Mason & Graham*
ATTORNEYS Patented May 23, 1950

2,508,805

UNITED STATES PATENT OFFICE 2,508,805

FRUIT PICKING DEVICE

William E. Scott, Los Angeles, Calif.

Application October 31, 1947, Serial No. 783,258

8 Claims. (Cl. 56—338)

This invention relates generally to fruit picking devices of the type wherein a cutter element is mounted on the end of a long pole for severing the stem of a fruit and means are provided at the opposite end of the pole for a person to operate the cutter element while holding the pole. In such devices means are sometimes provided for catching the severed fruit to prevent its damage by falling to the ground.

It is a primary object of this invention to provide a new and improved fruit picker of the general type indicated for the selective picking of fruit from trees at places inaccessible to the normal reach of the individual.

It is also an object of this invention to provide a lightweight, easily handled fruit picker which can be readily operated by a person without injuring the fruit either when the fruit is severed from the stem or as it falls after being severed. In this connection it is an object to provide a fruit picker in which no part of the device hides the fruit from the vision of the operator, thereby enabling the operator to see the fruit selected for picking from the moment it is first chosen until it is finally cut by the device.

It is a further object to provide, in a fruit picker of the type indicated, an improved means for severing the fruit from the stem and, in this connection, it is a particular object to provide a novel knife blade construction and assembly associated with the hopper for receiving the fruit.

It is also an object to provide a new and improved chute and receptacle for receiving and holding fruit after it is severed from the stem.

These and other objects will be apparent from the drawings and description thereof. Referring to the drawings:

Fig. 6 is an exploded view showing the parts of the cutter mechanism in perspective;

Fig. 7 is a section on line 7—7 of Fig. 5;

Fig. 8 is a section on line 8—8 of Fig. 5;

Fig. 9 is a section on line 9—9 of Fig. 5;

Fig. 10 is a section on line 10—10 of Fig. 5;

Fig. 11 is a section on line 11—11 of Fig. 5;

Fig. 12 is an elevational view of a modified form of hopper;

Fig. 13 is a section on line 13—13 of Fig. 12;

Fig. 14 is a section similar to Fig. 10 through a modified form of the invention; and Fig. 15 is a perspective view of a cover plate.

Figure 1:
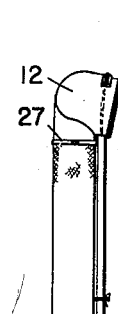
Fig. 1 is an elevational view of a fruit picker embodying the invention.
Figure 2:
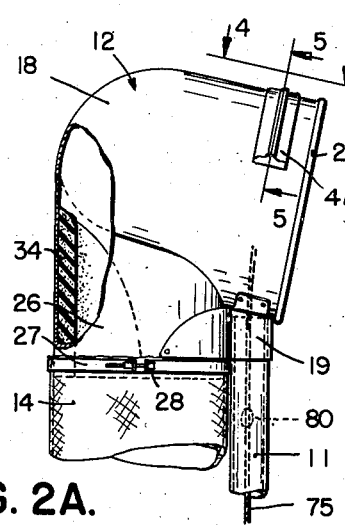
Fig. 2 is an enlarged side elevational view, partly in section, of the upper end of the fruit picker.
Figure 2A:
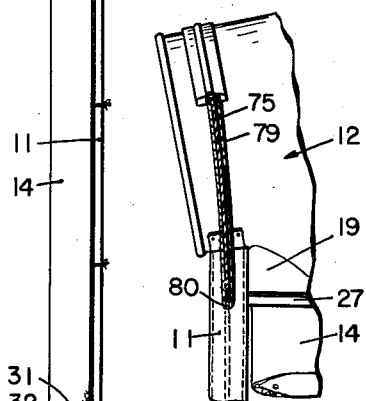
Fig. 2A is a fragmentary elevational view of the upper end of the fruit picker opposite to that shown in Fig. 2.
Figure 3:
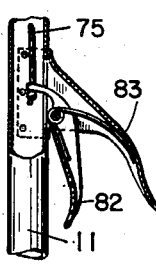
Fig. 3 is a fragmentary sectional view of a portion of the handle of the device.
Figure 4:
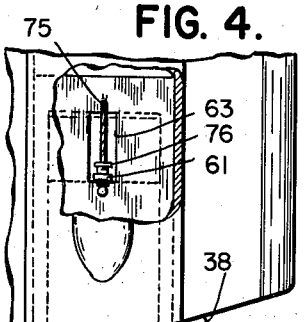
Fig. 4 is an enlarged fragmentary sectional plan view of a portion of the stem severing means taken on the plane 4—4 of Fig. 2.

More particularly describing the invention, reference numeral 11 generally indicates a pole or rod on one end of which is a fruit picking head 12 from which leads a chute 14 down the pole to a receptacle 15 located near the handle end 16 of the pole.

Figure 5:
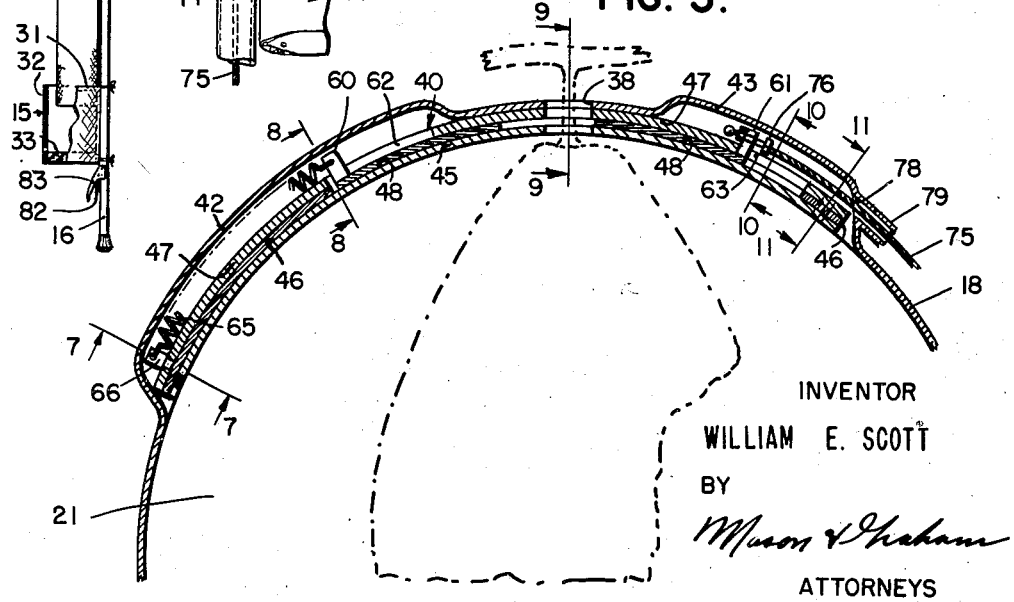
Fig. 5 is an enlarged section on line 5—5 of Fig. 2.

The pole 11 may consist of an elongated tubular metal member, preferably of light weight material, such as aluminum. At the upper or outer end of the pole is mounted the aforementioned head 12 which comprises what will be termed a hopper 18 mounted on a bracket 19 attached to the pole in any suitable manner. The hopper may be formed of lightweight metal or the like to provide a rim 20 which defines a large opening 21 (Fig. 5) to receive the fruit. Preferably, the hopper is mounted at a slight angle to the pole with the plane of the rim 20 being disposed at less than 180° relative to the pole 11.

The hopper includes a skirt 26 depending from the main portion of the hopper to which the bracket 19 is attached in part. The skirt 26 is adapted to support the upper end of the flexible chute 14, which may be made of fabric, such as canvas or the like. The upper end of the chute, which is tubular in shape, may be attached to the skirt as by means of a band-like clamp 27 having a take-up or tightening screw mechanism 28 thereon. The lower end of the chute 14 is received within the receptacle 15, being attached thereto by stitching 31 running about half-way around the lower end of the chute. The receptacle is of greater diameter than the chute, whereby the forward wall 32 projects somewhat beyond the chute, affording access thereto. The receptacle may be provided with a soft resilient padding 33 on its lower wall, of sponge rubber or the like. In this connection, the rear portion of the skirt 26 of the hopper is also preferably padded and numeral 34 indicates a padding which may be sponge rubber.

In the operation of the device, it is contemplated that a person using the fruit picker will hold the pole 11 in such manner that it is elevated at an angle from the vertical with the opening 21 of the hopper facing him. In order to sever the fruit from the stem the hopper is provided with stem receiving V-slot 38 which is centrally disposed in the upper wall portion of the front edge of the hopper and with suitable stem cutter or severing means 40 associated therewith.

Preferably the upper wall of the hopper 18 is formed to provide a pair of excrescences 42 and 43 which house certain portions of the cutting means, as will be apparent from the following description. The cutting means comprises a bottom plate 45, a guide plate 46, an upper plate 47, and a knife or cutter blade 48 which is received in the guide plate and between the bottom and top plates. Referring particularly to Figs. 5-11 inclusive, for a description of these parts, the bottom plate 45 is provided with a centrally disposed forwardly facing V-shaped recess 50. The top plate 47 is provided with a similar recess indicated by numeral 51. The central or guide plate 46 is formed to provide an elongated rectangular guide way opening 53 which is designed to slidably receive the cutter blade 48 and permit of limited longitudinal movement thereof. The forward edge of the guide plate is apertured at 54 in a position corresponding to the recesses 50 and 51 of the top and bottom plates. The guide plate is preferably slightly thicker than the knife or cutter blade 48 so that the cutter blade may be moved or reciprocated in the guideway 53 between the plates 45 and 47.

Suitable holes 56 are provided in the plates for securing the assembled plates to the hopper by means of screws 57 in a position whereby the recesses 50 and 51 of plates 45 and 47 are directly beneath and coincide with the inner end of slot 38 in the hopper.

In order to operate the cutter blade, the same is provided with a pair of upright lugs 60 and 61 which extend upwardly through slots 62 and 63 in the top plate 47. Lug 60 is adapted to receive the end of a tension spring 65 which extends from the lug over the top of the plate to a suitable retaining screw 66, the spring serving to retain the cutter blade in a position whereby the stem receiving slot of the device as a whole, indicated generally by numeral 38, is open, as will later be apparent.

The cutter blade 48 is provided with a recess 70 having an edge 71 corresponding to and adapted to normally lie in the same plane as the one edge of the slots 50 and 51 of the plates 45 and 47. The recess has two other edges, 72 and 73, forming a V which are sharpened to provide a cutting edge. With this construction, when the cutter blade is moved across the main recess 38, a stem therein is readily retained and severed without any likelihood of its being pushed out of the recess by movement of the cutter blade.

In order to actuate the blade a cable or wire 75 is attached to lug 61 by a suitable fitting 76. The cable extends through a hole 78 in the excrescence 43 and through a tube 79 leading to the interior of the pole at a point 80 below bracket 19. The cable extends through the pole to a manually operable lever 82 associated with a handle 83 near the lower end of the pole.

In the operation of the device, the fruit picker as a whole is elevated with the front or open end of the hopper facing the operator. The hopper is moved to the fruit selected for picking in order to bring the stem of the fruit into the recess 38 and the fruit itself within the confines of the hopper. The lever 82 can then be operated to slide the cutter blade across the opening 38 during which movement the stem of the fruit is caught by the V-shaped cutting edge 72—73 and severed thereby, the fruit dropping into the hopper and falling by gravity to the receptacle 15.

Figs. 12-15 inclusive show a modified form of the invention wherein a pole 11a supports a hopper 90 which is generally similar to the hopper 18 in shape, except that it is not provided with a skirt portion 26. In this form of the invention the fabric chute is directly attached to the hopper at 92 which may be formed along the margin to provide a double bead 93 to receive and retain a draw string, or wire 94 or other securing means. In this form of the invention the cutter blade mechanism is mounted on the outer surface of the hopper and a pair of separate cover plates, one of which is shown in Fig. 15 at 95, are provided in place of the excrescences 42 and 43. The cutter mechanism comprises the same plates previously described and shown in connection with Fig. 6. The cover plates are secured by means of the screws which fasten the cutter assembly to the hopper. This form of the invention operates in the same manner as the form previously described.

Although the invention has been particularly shown and described, it is contemplated that various changes and modifications may be made without departing from the scope thereof as indicated by the following claims.

I claim:

1. In a fruit picker having a pole, a hopper mounted on said pole and presenting an opening for the reception of a fruit, said hopper having a fruit stem receiving slot in its upper wall, a top plate and a bottom plate mounted on said hopper in the region of said slot, said plates having corresponding recesses substantially coinciding with the inner end of said slot, a guide plate having a guideway opening therein mounted between said plates, said guide plate being formed to provide an opening through its front edge to said guideway opening, a cutter blade mounted for sliding movement in said guideway opening, said blade having a recess formed therein in the region of the recesses in said plates, one edge of said recess being sharpened to provide a cutting edge, means yieldably holding said blade in a position with the cutting edge thereof to one side of said slot in said hopper, and means for moving said blade to cause said cutting edge to move across said slot.

2. In a fruit picker as defined in claim 1 in which said hopper is formed to provide excrescences housing said top and bottom plates, guide plate, cutter blade and cutter holding means.

3. In a fruit picker having a pole, a hopper mounted on one end of said pole, said hopper having an open front for the reception of a fruit to be picked and having an opening in its lower portion rearwardly of the front for the delivery of picked fruit, the upper wall portion of said hopper being disposed to overhang the lower wall portion thereof when said pole is vertically disposed, the upper wall portion of said hopper being provided with a stem receiving slot extending for a limited distance rearwardly from the front edge thereof and with stem cutting means carried by the hopper in the region of said slot and adapted to sever a stem in said slot.

4. A cutter mechanism for use as described, comprising, when assembled, a top plate, a bottom plate and an intermediate guide plate having a cutter blade guideway opening, said plates being formed and positioned to collectively provide a slot for the reception of a fruit stem or the like to be severed, means holding said plates together, a cutter blade slidably mounted in said guideway opening for longitudinal movement, said blade having a recess normally in the region of said slot, said recess having a V-shaped cutting edge facing transversely of said slot, means for yieldably holding said blade with the recess thereof in the region of said slot, and means for moving said blade to cause said cutting edge to move across said slot.

5. A cutter mechanism as defined in claim 4 in which said plates and said blade are longitudinally arcuate.

6. A cutter mechanism for use in severing the stem of a fruit comprising, when assembled, a top plate, a bottom plate corresponding in size to said top plate, said top and bottom plates having corresponding recesses formed in one side edge and extending transversely of the plates together forming a stem receiving slot, a guide plate between said top and bottom plates having a guideway opening therein extending longitudinally thereof, said guide plate having an opening in one side edge to said guideway opening, said last mentioned opening corresponding in position and width to the recesses in said top and bottom plates, a cutter blade mounted for sliding movement in the guideway opening of said guide plate, said cutter blade having a recess in one edge extending transversely of the blade, one edge of said recess in said cutter blade being sharpened to provide a cutting edge, means yieldably holding said blade in a position with the recess thereof in the region of the stem receiving slot and with said cutting edge to one side of said slot, means for moving said blade to cause said cutting edge to move across said stem receiving slot, and means securing said top and bottom plates and said guide plate together.

7. A cutter mechanism as described in claim 6 in which said top and bottom plates, said guide plate and said cutter blade are longitudinally arcuate.

8. A cutter mechanism for use in severing the stem of a fruit comprising, when assembled, a top plate, a bottom plate corresponding in size to said top plate, said top and bottom plates having corresponding recesses formed in one side edge and extending transversely of the plates together forming a stem receiving slot, a guide plate between said top and bottom plates having a guideway opening therein extending longitudinally thereof, said guide plate having an opening in one side edge to said guideway opening, said last mentioned opening corresponding in position and width to the recesses in said top and bottom plates, a cutter blade mounted for sliding movement in the guideway opening of said guide plate, said cutter blade having a recess in one edge extending transversely of the blade, one edge of said recess in said cutter blade being sharpened to provide a cutting edge, a lug extending upwardly from the upper surface of said cutter blade at each end thereof, a pair of longitudinally extending slots in said top plate through which said lugs extend, a tension spring secured to one of said lugs, means securing the other end of said spring beyond the end of said cutter blade, the other lug of said cutter blade being adapted to be connected to a cable or the like for operating the cutter blade, and means securing said top and bottom plates and said guide plate together.

WILLIAM E. SCOTT.

REFERENCES CITED

The following references are of record in the file of this patent:

UNITED STATES PATENTS

| Number | Name | Date |
|---|---|---|
| 460,903 | Woodward | Oct. 6, 1891 |
| 775,649 | Gregory | Nov. 22, 1904 |
| 916,055 | Swan | Mar. 23, 1909 |
| 1,100,965 | Farmer | June 23, 1914 |
| 1,309,712 | Adams | July 15, 1919 |